United States Patent [19]
Berney

[11] 3,973,153
[45] Aug. 3, 1976

[54] ROTOR FOR AN ELECTRONICALLY CONTROLLED MICROMOTOR

[76] Inventor: Jean-Claude Berney, Chemin des Croix-Rouges 3, Lausanne, Switzerland

[22] Filed: Feb. 3, 1975

[21] Appl. No.: 546,981

[30] Foreign Application Priority Data
Feb. 7, 1974 Switzerland .......................... 1676/74

[52] U.S. Cl. ................................. 310/156; 310/263
[51] Int. Cl.² ........................................ H02K 21/12
[58] Field of Search ............. 310/156, 263; 335/302

[56] References Cited
UNITED STATES PATENTS

| | | | |
|---|---|---|---|
| 2,133,082 | 10/1938 | Cox ..................................... | 310/156 |
| 2,230,878 | 2/1941 | Bohli .................................... | 310/156 |
| 3,513,341 | 5/1970 | Gratzmuller ........................ | 310/156 |

*Primary Examiner*—Donovan F. Duggan
*Attorney, Agent, or Firm*—Haseltine, Lake & Waters

[57] ABSTRACT

A rotor for a micromotor with electronic control comprising an axle on which are mounted two plates of ferro-magnetic material at least one of which carries permanent magnets, all the permanent magnets mounted on the same plate being of the same polarity. Poles of ferro-magnetic material are interposed between these magnets and each plate is separately magnetized after mounting of the magnets, in a unidirectional magnetic field before assembling the two plates on the axle. The magnets can be mounted on a intermediate element of non-ferro-magnetic material which itself is fixed on the plate by adhesives, riveting, or swaging. The two plates are mounted on the axle such that the magnets of one face the poles of ferromagnetic material of the other.

10 Claims, 5 Drawing Figures

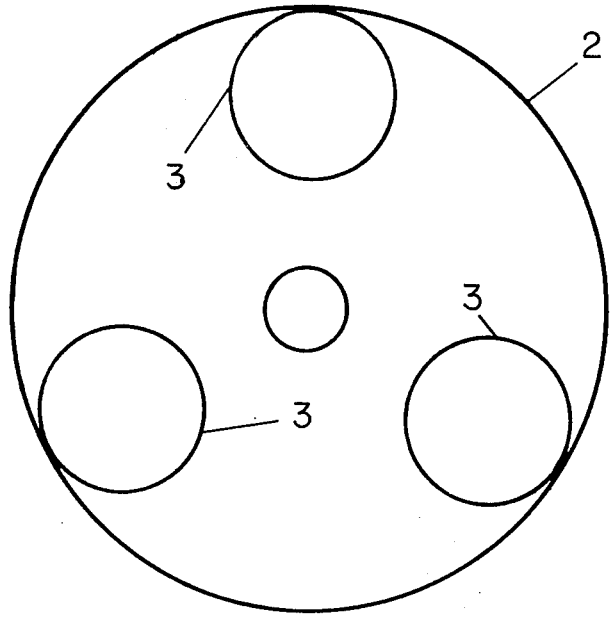
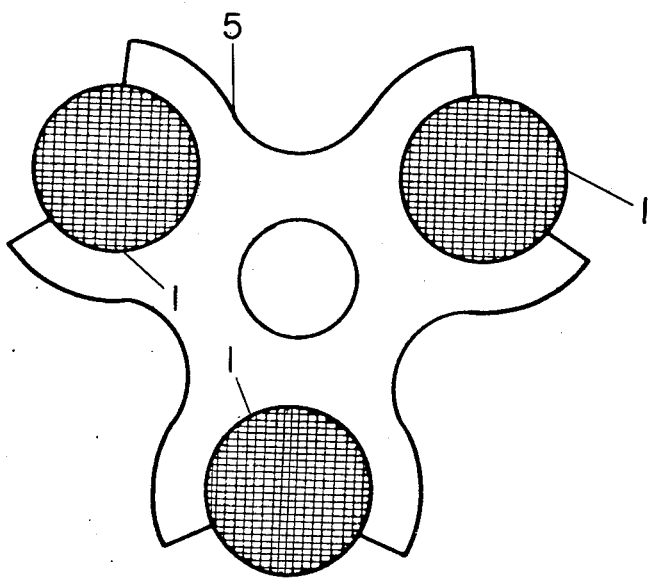

ROTOR FOR AN ELECTRONICALLY CONTROLLED MICROMOTOR

FIELD OF THE INVENTION

The invention relates to a rotor construction for an electronically controlled micromotor such as for a watch.

BACKGROUND OF THE INVENTION

It is well-known that one can realize an electric micromotor with a rotor comprising a magnetic circuit constituted by one or a plurality of permanent magnets which, when the rotor turns, creates an alternating magnetic field and induces a voltage of the terminals of one or a plurality of fixed coils situated in the air gaps of said alternating magnetic circuit. The speed of rotation is maintained by the electrical energy furnished by an electronic control circuit which delivers current impulses in phase with the induced voltage.

This type of motor can be synchronized in such manner as to rotate in synchronism with a reference frequency, delivered, for example, by a quartz oscillator and a frequency divider while proportioning this energy by means of a regulating circuit.

If it is desired to obtain a high output, it is necessary to create an alternating field of the highest possible frequency to have an elevated value of $(d\phi/dt)$, and therefore, a substantial induced voltage. This is indispensable especially in applications for watches where the volume and the output play a very great role.

In the rotors of known construction, magnets of opposite polarity are placed very close to one another and must be magnetized in place, as it is practically impossible to mount premagnetized magnets in mass production. This operation is long, therefore costly, and generally only one piece can be magnetized at a time.

SUMMARY OF THE INVENTION

An object of the invention is to provide a rotor of particular construction which avoids these disadvantages and permits a much easier magnetization and of better quality.

The rotor according to the invention comprises an axle on which are mounted two plates of ferro-magnetic material, at least one of which carries permanent magnets, all the permanent magnets mounted on the same plate being of the same polarity, poles of ferro-magnetic material being interposed between said magnets, the magnets of each plate being magnetizable simultaneously, in a uni-directional magnetic field after mounting the magnets on the plate and assembling two plates on the axle.

As these elements are of very small size, a plurality thereof can be magnetized at the same time in the magnetic field of a sufficiently large electromagnet.

BRIEF DESCRIPTION OF THE DRAWING

The attached drawing shows, by way of example, embodiments of a rotor according to the invention.

FIG. 4 is a plan view of a plate in the course of its manufacture; and

FIG. 5 shows a modified arrangement for maintaining the magnets on the plate.

DETAILED DESCRIPTION

Figure 1:
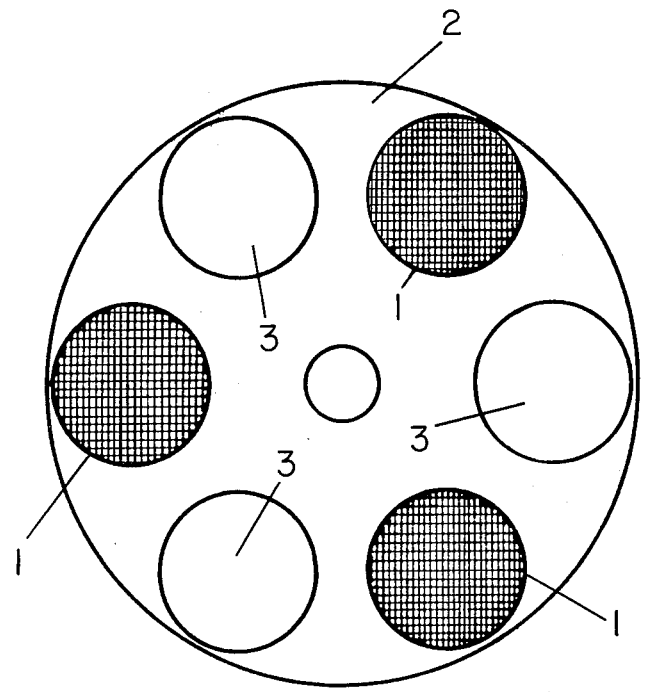
FIG. 1 is a plan view of a rotor plate with the magnets mounted therein.
Figure 2:
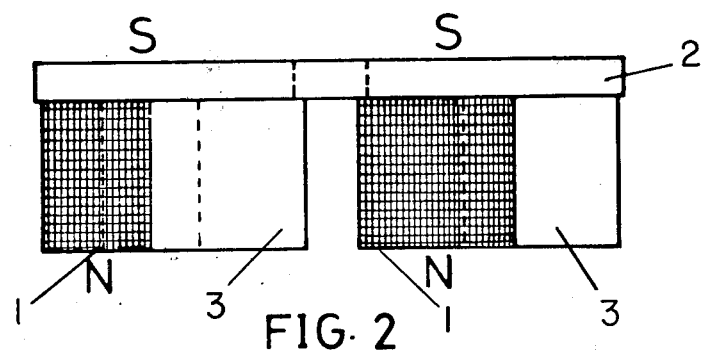
FIG. 2 is an elevational view thereof.

Referring to FIGS. 1 and 2, therein are seen three permanent magnets 1 adhesively secured on a plate 2 of ferro-magnetic material. These magnets are disposed at 120° with respect to a central opening for an axle 4. Three poles 3 of ferro-magnetic material of the same shape as the magnets 1 are interposed therebetween. These three poles 3 can be inset and fixed by adhesives, welding, or riveting. They can also be integrally formed with the plate by stamping or folding. The three magnets 1 are magnetized with the same polarity. This permits magnetizing the mounted plate in a unidirectional magnetic field.

Figure 3:
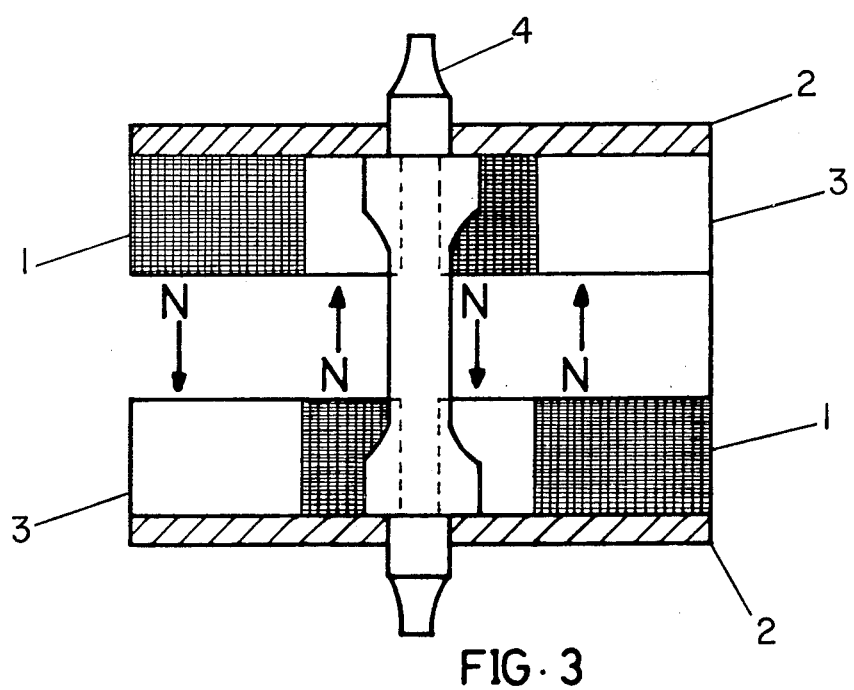
FIG. 3 is a longitudinal sectional view taken through a complete rotor.

In FIG. 3 can be seen the complete rotor formed by two plate assemblies as just described. The two plate assemblies, which each comprise plate 2 on which is mounted the three magnets 1 and the three poles 3, are mounted face-to-face on axle 4 such that each magnet faces a respective pole.

It can be seen that there is thus formed six magnetic fields of the same intensity which are successively reversed and create an alternating magnetic field when the rotor turns.

FIGS. 4 and 5 show a particular manner of securing the magnets 1. Therein, instead of directly adhesively securing the magnets 1 on plate 2, the magnets are set in an intermediate element 5 of non-ferro-magnetic material (FIG. 5) which itself will be fixed by adhesives, riveting, swaging, or welding on plate 2 (FIG. 4) carrying the poles 3. By way of example, the setting of the magnets 1 in element 5 can be by resilient engagement in open grooves provided in the intermediate element. This method eliminates the mounting of the magnets by adhesives which is a delicate operation.

It is clear that the magnets on each plate can be of any number. It is also clear that the magnets only need be mounted on one of the plates. In the latter case, of course, the dispersion of the magnetic field will be much greater.

What is claimed is:

1. A rotor for a micromotor comprising an axle, and two juxtaposed plates of ferromagnetic material secured on said axle, at least one of said plates including a plurality of angularly spaced permanent magnets secured thereon and extending axially from said one plate, said magnets being axially magnetized and of the same polarity, the other of said plates including poles of ferromagnetic material axially aligned with said permanent magnets on said one plate and in spaced relation therewith, and means mounting said plates on said axle for permitting said one plate to be separately magnetizable in a unidirectional magnetic field after mounting said magnets thereon and before assembling the two plates on said axle.

2. A rotor as claimed in claim 1 comprising axial pole of ferromagnetic material mounted on said one plate between said magnets.

3. A rotor as claimed in claim 1 comprising an intermediate plate of non-ferromagnetic material, said magnets being secured to said intermediate plate, said intermediate plate being, in turn, fixedly mounted on said one plate.

4. A rotor as claimed in claim 3 wherein said magnets are non-adhesively secured to said intermediate plate.

5. A rotor as claimed in claim 4 wherein said magnets are snap-engaged in grooves provided in said intermediate plate.

6. A rotor as claimed in claim 2 wherein said poles are integrally formed with said one plate.

7. A rotor as claimed in claim 1 wherein said magnets are mounted on both plates with said poles interposed therebetween, the magnets on each plate and being spaced therefrom facing the poles on the other plate.

8. A rotor as claimed in claim 7 wherein said magnets are equally spaced on the respective plate.

9. A rotor as claimed in claim 7 wherein the magnets on one plate are of same polarity as the magnets on the other plate.

10. A rotor as claimed in claim 1 whereon said plates are parallel and extend perpendicularly to said axle, said magnets having poles of the same polarity facing towards the space between the magnets on the two plates.

* * * * *